Jan. 2, 1934.  G. C. APPEL ET AL  1,942,351
STORAGE BATTERY
Filed Dec. 3, 1928   2 Sheets-Sheet 1

INVENTORS
George C. Appel
Robert W. Vicarey
and John D. Wanvig Jr
BY Bottum, Hudnall, Lecher, McNamara & Michael.
ATTORNEYS Jan. 2, 1934.  G. C. APPEL ET AL  1,942,351
STORAGE BATTERY
Filed Dec. 3, 1928   2 Sheets-Sheet 2
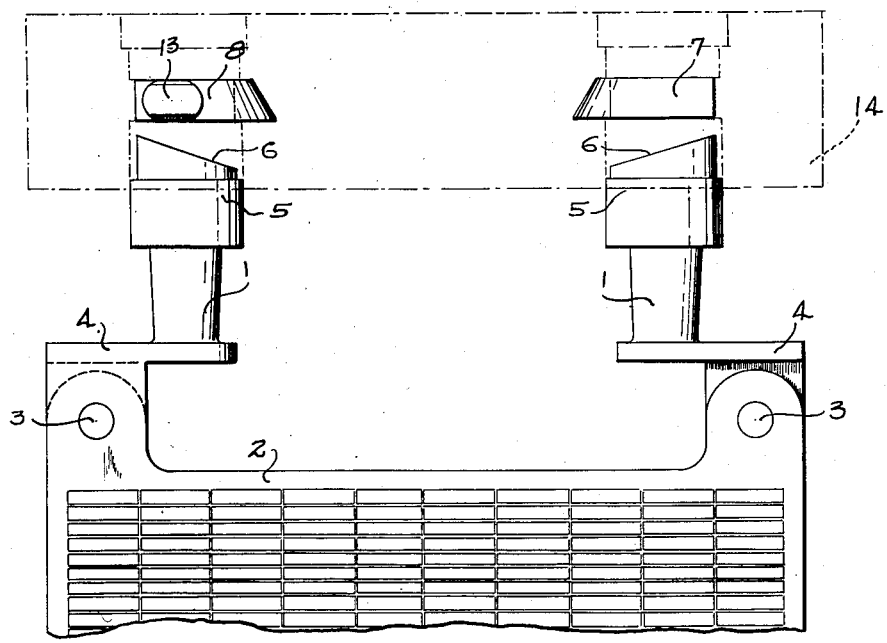
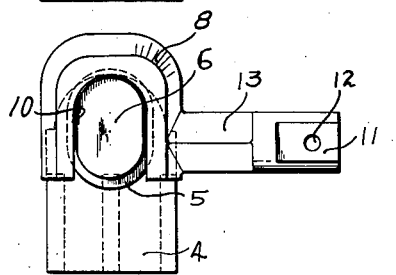
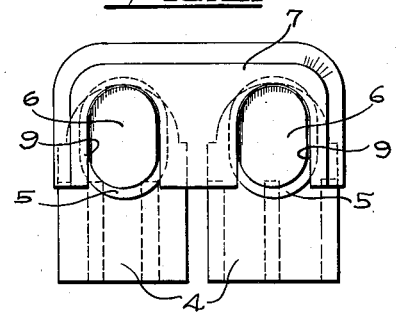
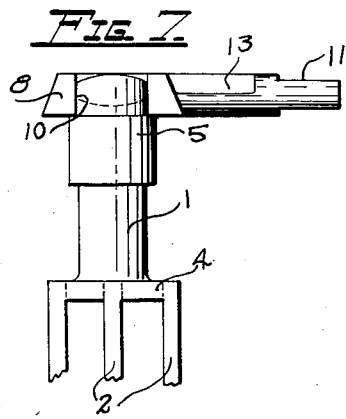
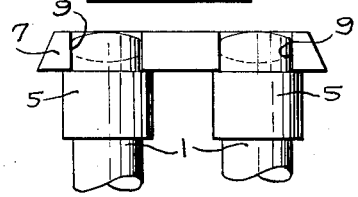
INVENTORS
George C. Appel
Robert W. Vicarey
and John D. Wanvig Jr.
BY
Bottum, Hudnall, Lecher, McNamara & Michael
ATTORNEY.

Patented Jan. 2, 1934

1,942,351

UNITED STATES PATENT OFFICE 1,942,351

STORAGE BATTERY

George C. Appel, Robert W. Vicarey, and John D. Wanvig, Jr., Milwaukee, Wis., assignors to Globe-Union Mfg. Co., Milwaukee, Wis., a corporation of Wisconsin Application December 3, 1928. Serial No. 323,415

6 Claims. (Cl. 136—134)

This invention relates to storage batteries and more particularly to covers, terminals and connectors for storage batteries.

Heretofore, considerable trouble has been experienced in storage batteries having acid electrolytes due to the leakage of acid through the vents in the cover and around the posts or connectors and also to loosening and corrosion of the latter. This leakage, corrosion and loosening is more noticeable in batteries used on automobiles or motorcycles because of the vibration transmitted to the battery by the machine. Acid which has thus leaked from the jar or cover corrodes the exposed metal parts of the battery or supporting frame and particularly the terminals and connectors.

An object of the present invention is to provide a storage battery cover which eliminates such leakage and which has improved means for interconnecting the cells of the battery and for connecting terminals thereto in order to prevent such electrical connecting devices from becoming loosened by vibration and to prevent leakage of the electrolyte around such devices.

Another object of the invention resides in the provision of terminals and connectors which are integral with the plates of the battery and are enclosed in insulating material as much as possible so as to prevent corrosion thereof.

A further object is to provide a novel method of mounting the terminals and connectors of a storage battery in the cover thereof and in connecting them to the plates or electrodes so that better and more permanent connections can be made than in methods heretofore used.

A further object is to provide a battery with a cover which carries the terminals and connectors and yet is smooth and easily cleaned and which has no metal parts on the top.

Other objects and advantages in both the method employed and the article manufactured will appear hereinafter.

In accomplishing the above objects, links are imbedded in the cover of the battery to provide terminals and cell connectors. One end of each of the terminals extends out through the side of the cover to provide means for making an external connection thereto while a portion adjacent the other end of the terminal and portions adjacent the ends of the cell connectors are positioned in the cover at points adjacent holes therein to provide means for engaging the posts of the cells. These posts are integrally fastened to the plates of the cells and are then assembled with the cover so as to project into the holes in the cover so as to engage the links. The links are then burned or otherwise secured to the posts and the holes are filled up with insulating material leaving the top surface of the battery smooth and entirely free and unobstructed.

The invention thus contemplates a construction of terminals and connectors in which the manufacture of the battery is greatly facilitated and the mechanical strength and quality thereof are increased by the provision of such a construction and method.

In the drawings:

Figure 4 is a side view of the plates, posts and connecting devices used in the construction of Figure 1 showing the insulating cover in dotted lines and showing the relation of connecting devices to the posts when the cover unit is ready for assembly therewith;

Figure 5 is a plan view of the post and terminal link as assembled;

Figure 6 is a plan view of a cell connecting link assembled with two posts;

Figure 7 is a side view of the terminal link and post of Figure 5; and

Figure 8 is a side view of the cell connector and posts of Figure 6.

Figure 1:
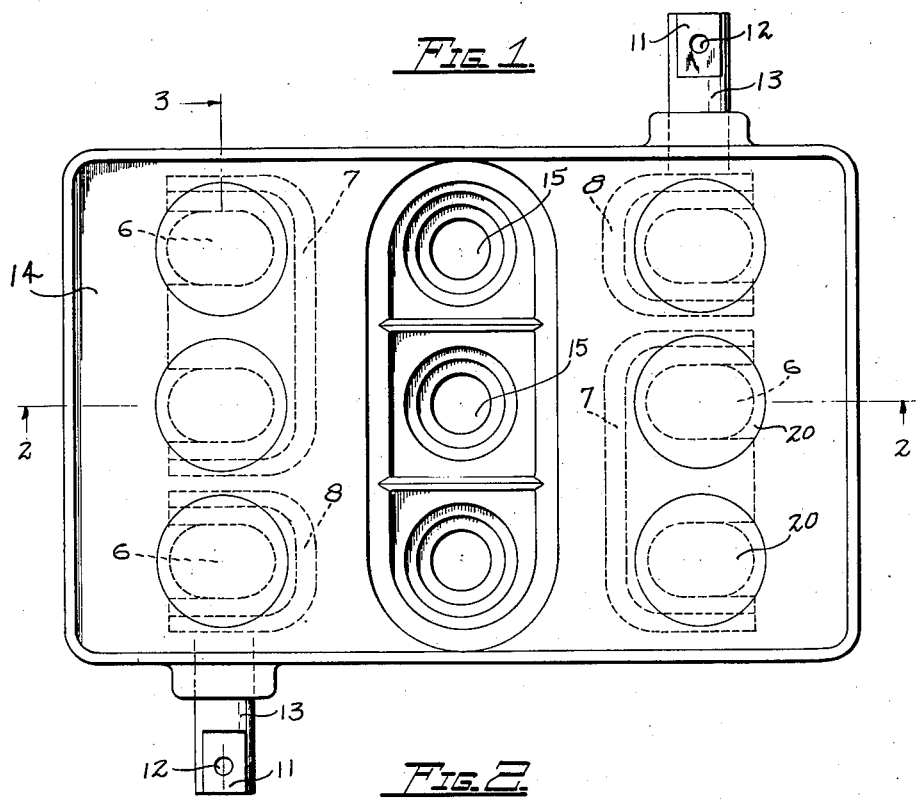
Figure 1 is a plan view of a cover unit showing one embodiment of the invention and showing in dotted lines the relative position of the posts, connectors and terminals.
Figure 2:
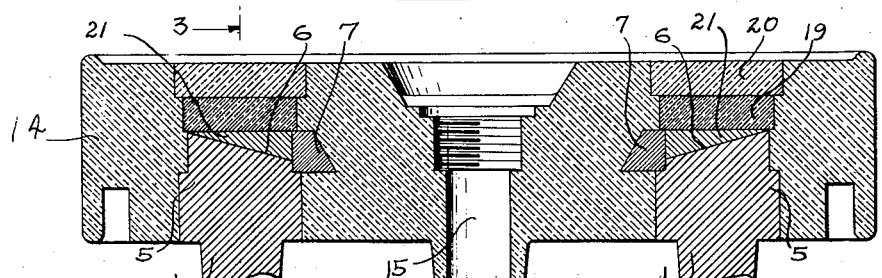
Figure 2 is a cross sectional view on the line 2—2 of Figure 1.
Figure 3:
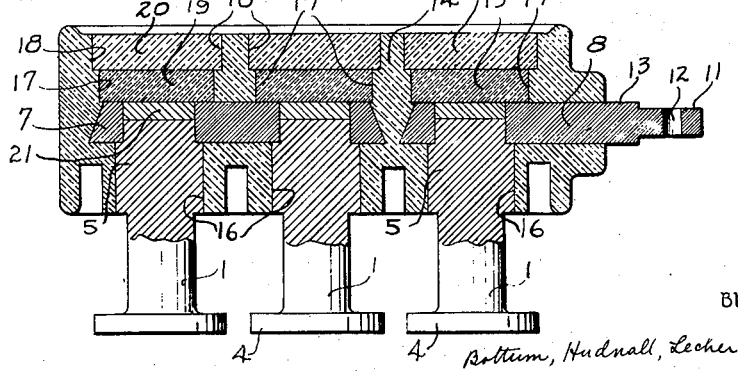
Figure 3 is a cross-sectional view on the line 3—3 of Figure 1.

In the drawings, the reference numeral 14 designates a cover unit for a three cell battery. As shown in Figures 1, 2 and 3, this unit may consist of a block of insulating material which is provided with the customary vent tubes 15 and in which cell connector links 7 and terminal links 8 are imbedded. The cell connectors 7 are two in number and are arranged on opposite side of the cover unit as shown in dotted lines in Figure 1 and are mounted intermediately of the top and bottom surfaces thereof so as to be entirely within the cover. The terminals 8 also two in number are arranged in line with the cell connectors as shown in dotted lines in Figure 1, but have portions 13 which extend through the side walls of the cover to provide means for making external electrical connections to the battery.

The cover unit is preferably formed by a moulding operation. In carrying out this operation, the cell connectors and terminals are arranged in proper spaced relation and the insulating material is then formed about them. Suitable cores may be used for holding the metallic members in position and for providing openings 16, 17 and 18 in the cover, which are of different diameters and which extend through the top and bottom of the cover.

Figures 5 to 8 inclusive show in detail, the construction of the cell connectors 7, terminals 8 and the posts 1 with which they are adapted to interfit. The posts 1 are connected to the plates 2 of the cells of a battery through connecting straps 4 and insulating pins 3. The posts may be secured to the straps 4 in any known manner but preferably by a burning operation. Two posts are provided for each cell, one being electrically connected to the negative plates thereof and the other to the positive plates. These posts 1 thus constitute the positive and negative poles of the cell. The posts 1 are provided with flanges 5 and with beveled top portions 6 for aiding in the burning process which will be described hereinafter.

The cell connectors 7 and the terminals 8 make the proper electrical connections between the posts and provide means for securing them to the cover. As shown in Figures 5 and 7, each terminal member 8 consists of a flat or plate shaped link provided with a slot 10 adapted to fit over the projecting top 6 of a post and rest upon its flange 5. Due to the bevelled portion on the post, a wedge shaped pocket is formed between the top of the post and the walls of the slot, the height of the outer end of the post being approximately the width of the terminal link above the flange 5. The terminal also has an extending arm 13 which is provided with a flattened portion 11 which may be drilled as shown at 12 to provide means for making an external connection to the battery.

As shown in Figures 6 and 8, each cell connector 7 comprises a flat or plate shaped link which has two slots 9 in one edge thereof. This link is adapted to connect two posts of unlike polarity of different cells of the battery, and when arranged as in Figure 1, connect the cells in series. When the connector is placed upon a post, a pocket is formed between the walls of the slot and the beveled top of the post like the pocket formed by the terminal member and its post described above.

With the terminals and connectors imbedded in the cover as described above, the walls of the slots therein are exposed through the openings 16, 17 and 18. The openings 16 are of suitable size to snugly receive the flanges 5 of the posts 1 which, after being secured to the plates, are assembled with the cover 14 by placing them in the openings 16 thereof as illustrated in Figure 4. As the posts are moved further into the openings, the top portions 6 of the posts engage the walls of the slots and form the pockets as noted above.

A plurality of cover units and plates may be thus assembled and arranged in rows. The tops 6 of the posts and the sides of the slots in the connecting devices may then be fused or integrally united together. This may be accomplished by a burning process in which the flame of a torch is first directed against the abutting ends of the parts through the openings 17 and 18. This produces an initial fusion. After this step, metal is added from a stick of lead or the like to fill the pocket. Because of the beveling on the tops 6, a large amount of molten metal need not be burned in the pocket since the molten metal engages all three walls of the slot without the necessity of filling up the opening 17 along the side wall where the slot in the link is open, as would be necessary were the top 6 flat.

This construction has the further advantage of preventing molten metal from coming into direct contact with the insulation and obviates the danger of damage which might ensue from such contact. As the molten metal fills the pockets, it causes the connectors and terminals to be burnt or integrally united with the posts with which they are associated. Figure 2 shows the positioning of the parts when the molten metal 21 is applied to fill the pocket. In this burning process, the lines between the posts, links and added metal 21 are, of course, obliterated.

Because a plurality of cover units and plates may be assembled in rows, it will be seen that the manufacture of the batteries is greatly facilitated, since all that the operator need do, to connect the plates properly electrically and to secure them to cover, is burn metal in the rows of openings on the covers.

The covers and plates so connected may then be lifted bodily and inserted in a battery jar or vessel, a sealing compound 19, such as pitch, and insulating plugs 20 may be placed in the openings 17 and 18 and the battery completed in the usual manner by placing acid and water therein through the vents 15 in the cover.

In the above described battery, the terminals are shown and described as being of a certain shape and projecting laterally from the cover and the cover is shown and described as made of insulation. It is obvious, however, that these details as well as others are susceptible of change and modification within the scope of the invention. For instance the terminals might extend out through the top of the battery or the cover might be constructed of other than insulation but provided with insulating bushings or other means for preventing short-circuiting of the battery or the cells thereof. It is also apparent that the terminals and cell connectors might be held in position in various ways without being imbedded in the cover as shown.

Thus, while only one embodiment of the invention is disclosed herein, it is to be understood that changes may be made without departing from the spirit of the invention or the scope of the annexed claims. It is also to be understood that the words "electrical connecting devices" in the annexed claims are not to be considered as limited to the connectors 7 but also include the terminals 8 or other electrical or conducting devices suitable for the purpose.

We claim:

1. In combination, a cover for a storage battery, electrical connecting devices imbedded in said cover beneath the upper surface thereof and posts for making mechanical and electrical connections between electrodes of the battery and said connecting devices, said posts and connecting devices being of such shape that pockets are formed therebetween for facilitating burning the posts to the connecting devices.

2. In combination, a cover for storage batteries having openings in the top thereof, electrical connecting devices imbedded in said cover and having slots beneath the openings therein and posts for making mechanical and electrical connections between electrodes of the battery and said connecting devices, said posts having portions adapted to enter said slots and form pockets with said connecting devices whereby the posts may be secured to said connecting devices by placing molten metal in the pockets so formed.

3. A storage battery including a cover provided with an opening extending therethrough from the top to the bottom thereof, a metallic conducting member having at least a portion embedded in the cover below the top thereof, said embedded portion being provided with a slot extending through an edge thereof, said slot being alined with the opening of the cover, a battery plate post having a portion fitted in the opening of the cover below the metallic conducting member and formed with a shoulder engaged with the marginal wall of the slot, said post also having a beveled top portion above said shoulder extending into the slotted portion of the metallic conducting member and coacting therewith to provide a pocket whereby the post may be secured to the conducting member by placing molten metal in the pocket, and means for closing and sealing the opening of the cover above the top of the metallic conductor.

4. A storage battery including a cover provided with an opening extending therethrough from the top to the bottom thereof, a metallic conducting member having at least a portion embedded in the cover below the top thereof, said embedded portion being provided with a slot extending through an edge thereof, said slot being alined with the opening of the cover, a battery plate post extending up through the portion of the opening of the cover below the metallic conducting member and having a beveled top portion extending into the slotted portion of the metallic conducting member and coacting therewith to provide a pocket whereby the post may be secured to the conducting member by placing molten metal in the pocket and means for closing and sealing the opening of the cover above the top of the metallic conductor.

5. A storage battery including a plurality of cells, battery plates and electrolyte in said cells, posts connected to the battery plates, a premolded cover having a plurality of openings extending therethrough from the top to the bottom thereof, there being one such opening for each battery post, cell connectors embedded in the cover between the top and bottom thereof and having openings alined with certain of the openings of the cover, terminals having portions embedded in the cover, the embedded portions of the terminals being provided with openings alined with the other openings of the cover, said posts extending into the portions of the openings of the cover located below the terminals and the connectors and being engaged with the connectors and terminals below the top of the cover, a fused metallic union between the posts and the connectors and terminals below the top of the cover, and means for closing and sealing the portions of the openings of the cover above the connectors and terminals.

6. A storage battery including a plurality of cells, battery plates and electrolyte in said cells, posts connected to the battery plates, a premolded cover having a plurality of openings extending therethrough from the top to the bottom thereof, cell connectors embedded in the cover between the top and bottom thereof and having openings alined with the openings of the cover and interfitted with the upper portions of the post, a fused metallic union between the posts and the connectors below the top of the cover and means for sealing the portions of the openings of the cover above the connectors.

GEORGE C. APPEL.
ROBERT W. VICAREY.
JOHN D. WANVIG, Jr.